(12) United States Patent
Metayer (10) Patent No.: US 10,042,243 B1
(45) Date of Patent: Aug. 7, 2018

(54) DIGITAL FIREARM SIGHT

(71) Applicant: Lugol Metayer, Hephzibah, FL (US)

(72) Inventor: Lugol Metayer, Hephzibah, FL (US)

( * ) Notice: Subject to any disclaimer, the term of this patent is extended or adjusted under 35 U.S.C. 154(b) by 0 days.

(21) Appl. No.: 15/458,057

(22) Filed: Mar. 14, 2017

(51) Int. Cl.
| | | |
|---|---|---|
| *F41G 1/35* | (2006.01) |
| *G03B 29/00* | (2006.01) |
| *F41G 11/00* | (2006.01) |
| *H04N 5/225* | (2006.01) |
| *F41C 27/00* | (2006.01) |
| *F41G 1/36* | (2006.01) |
| *G02B 27/20* | (2006.01) |

(52) U.S. Cl.
CPC ............ *G03B 29/00* (2013.01); *F41G 11/003* (2013.01); *H04N 5/2252* (2013.01); *F41C 27/00* (2013.01); *F41G 1/35* (2013.01); *F41G 1/36* (2013.01); *G02B 27/20* (2013.01)

(58) Field of Classification Search
CPC ........................................................ F41G 1/32
USPC ............................ 42/111, 119, 114; 396/426
See application file for complete search history.

(56) References Cited

U.S. PATENT DOCUMENTS

| | | | |
|---|---|---|---|
| 6,000,163 A | 12/1999 | Gordon | |
| 6,539,661 B2 | 4/2003 | Hope | |
| 7,437,848 B2* | 10/2008 | Chang | F41G 1/32 |
| | | | 42/119 |
| 7,810,273 B2* | 10/2010 | Koch | F41A 17/066 |
| | | | 42/111 |
| 8,156,679 B1* | 4/2012 | Swan | F41G 11/003 |
| | | | 33/263 |
| 8,297,173 B1 | 10/2012 | Teetzel et al. | |
| 8,915,008 B2* | 12/2014 | Mauricio | F41G 1/38 |
| | | | 42/111 |
| 9,591,255 B2* | 3/2017 | Sakiewicz | H04N 5/772 |
| 9,702,661 B2* | 7/2017 | Kremer | F41G 1/38 |
| 2008/0107414 A1* | 5/2008 | Showalter | F41G 11/004 |
| | | | 396/429 |
| 2011/0167708 A1* | 7/2011 | Cheng | F41G 1/345 |
| | | | 42/114 |
| 2013/0333266 A1* | 12/2013 | Gose | F41G 1/00 |
| | | | 42/111 |
| 2014/0075821 A1* | 3/2014 | Li | F41G 1/38 |
| | | | 42/130 |
| 2014/0305022 A1* | 10/2014 | Chung | F41G 1/16 |
| | | | 42/113 |
| 2016/0018190 A1* | 1/2016 | Craven | F41G 1/38 |
| | | | 42/119 |
| 2016/0102944 A1* | 4/2016 | Li | F41G 1/38 |
| | | | 42/111 |

\* cited by examiner

*Primary Examiner* — Reginald Tillman, Jr.

(74) *Attorney, Agent, or Firm* — GrayRobinson, P.A.

(57) ABSTRACT

A digital firearm sight comprising a housing and a plurality of cameras, motion sensors, lights, and laser sights. The digital firearm sight further comprises a removable secondary device having its own independent laser sight and light and motion sensor. The housing further comprises a touchscreen display so that the user can see what any of the cameras are capturing. The housing preferably has beveled edges and is 1.5 to 3.5 inches tall or long.

32 Claims, 5 Drawing Sheets

DIGITAL FIREARM SIGHT

TECHNICAL FIELD

This disclosure relates to a firearm sight. Specifically, this disclosure relates to a detachable modular digital firearm sight for use with rifles and handguns as well as other weapons such as bows, air guns, and drones while containing photographic, night-vision, thermal imaging, and motion sensing capabilities.

BACKGROUND OF THE INVENTION

Currently, firearms use a number of different sights to provide a shooter with better aim and higher precision. Most sights are permanently attached to the weapon they are modifying. Some sights are modular and can be removed through the use of a picatinny rail system or other similar attachment method. Presently, however, the prior art lacks a modular digital firearm sight that is durable and can withstand environmental conditions and containing the characteristics described herein. Specifically, the present invention is directed to a compact digital firearm sight incorporating a number of additional features improving a shooter's ability to aim.

For example, U.S. Pat. No. 6,00,163 discloses a sight which uses a camera for taking pictures of a target proximate the instant at which a shot is fired from a weapon. The camera is integrated with the sight and faces forward to capture what the shooter is targeting. The present invention has more advanced modularity or other capabilities such as night vision or the ability to take a picture of a target at a distance or to track shots taken. Another similar device is described in U.S. Pat. No. 6,539,661 but only takes an image upon the pull of a trigger. The present invention does not require the pull of the trigger nor does it only face forward.

U.S. Pat. No. 8,297,173 is directed to a modular weapon display system which can include an accessory mount interface for attaching accessories such as thermal sight systems, rotating left and right camera systems, video display systems, quick changing power supplies, optical scopes, tactical flashlights, vertically extending handgrips, or other weapon-mounted accessories. However, the present invention does not require any accessory, such as thermal sight systems or camera systems, to be mounted separately as they part of the unit.

Therefore it is an object of this invention to provide an improvement which overcomes the aforementioned inadequacies of the prior art devices and methods and provides an improvement which is a significant contribution to the advancement of the firearm sight art.

Another object of this invention is to provide a small, compact, and lightweight detachable sight for ease of use.

Another object of this invention is provide a sight having motion sensing capabilities to alert a shooter of peripheral threats.

Another object of this invention is to provide a sight with polarized lenses to provide better aiming capabilities.

Another object of this invention is to provide a sight with heat and night vision capabilities to alert a shooter of threats and to provide better aiming capabilities.

Another object of this invention is to provide a sight with a pivoting camera and telescopic camera that allows an optical zoom with a field of view having a distance of 1000 yards or more with 60× optical zoom or better.

Another object of this invention is to provide a sight with facial recognition capabilities.

Another object of this invention is to provide a sight with laser sight or red dot sight capabilities.

Another object of this invention is to provide a sight that can be powered either through lithium ion batteries (or other similar physical batteries) or solar power.

Another object of this invention is to provide a sight that can be quickly detached and used independently on other rifles and devices.

Another object of this invention is to provide a removable, low-profile sight to provide a high-powered light and laser for low-light situations.

Another object of this invention is to provide a sight further comprising a removable device from the main unit that has a camera, motion sensor, light and laser to assist with staying on target for use with pistols.

The foregoing has outlined some of the pertinent objects of this invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

For the purpose of summarizing this invention, this invention comprises a digital firearm sight comprising a housing having a tapered front section with a flat front face. The tapered front section slopes inward to the flat front face. The top portion of the tapered front section can house a first laser sight and a first light. The housing includes a digital camera. The digital camera serves as the sight for the user of the weapon. The back face of the housing has a LED touchscreen display.

The housing also includes a back face, a first side face, a second side face, a top face, a bottom face, and a removable secondary sight. The primary and removable secondary light can be controlled either through the LED touchscreen display, voice command, hand command, or through the use of a Bluetooth-enabled smart device. The removable secondary sight also preferably includes a camera, motion sensor, second laser sight and second light. When the removable secondary sight is engaged with the housing (as will be described in more detail below), the second laser sight and second light are preferably inoperable so that there is no confusion with the first laser sight and first light. First light and second light may also operate at the same time to provide the user with more light. The top face also preferably has solar panels to provide power when/if the battery runs out of power.

The digital firearm sight is preferably used with rifles. However, the removable secondary sight can be disengaged from the housing and connected to the underside of a pistol to provide the user with a laser sight. The removable secondary sight uses a rail system to engage with the housing and is preferably the same type of rail system used to attach the housing to a rifle. The rail system can be any style such as picatinny or weaver.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures and methods for carrying out the same purposes of the present invention. It should also be realized by those skilled in the art that such equivalent constructions and methods do not depart from the spirit and scope of the invention as set forth in the appended claims.

BRIEF DESCRIPTION OF THE DRAWINGS

For a more complete understanding of the present disclosure and its advantages, reference is now made to the following descriptions, taken in conjunction with the accompanying drawings, in which.

Similar reference numerals refer to similar parts throughout the several views of the drawings.

DETAILED DESCRIPTION OF THE DRAWINGS

The following description is of a preferred embodiment presently contemplated for carrying out the invention. This description is not to be taken in a limiting sense, but is made merely for the purpose of describing one or more preferred embodiments of the invention. The scope of the invention should be determined with reference to the claims.

As shown in the accompanying drawings, for purposes of illustration, the present invention uses specific methods and technologies for a digital firearm sight to provide a compact, lightweight, removable digital firearm sight with aiming improvement capabilities.

Figure 1:
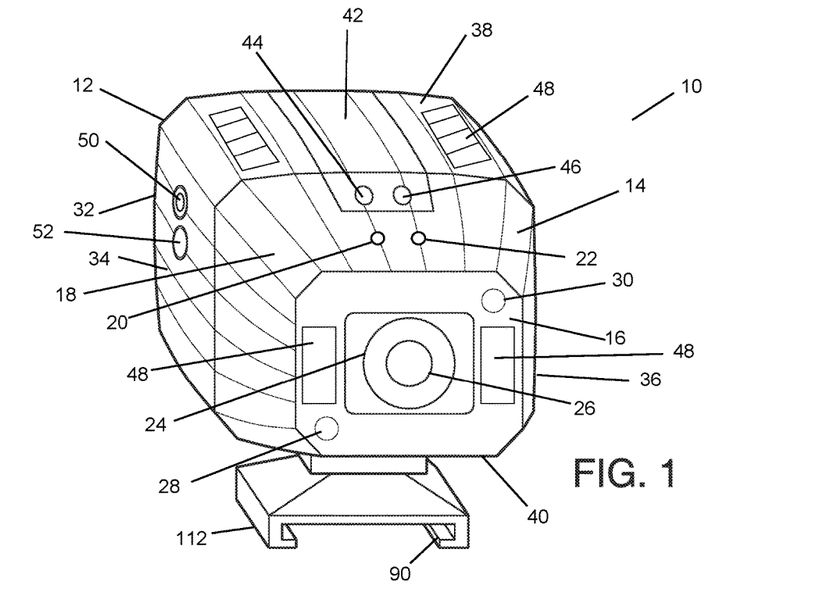
FIG. 1 is a perspective view of the digital firearm sight.

As shown in FIG. 1, the digital firearm sight 10 comprises a housing 12 having a tapered front section 14 with a flat front face 16. The tapered front section 14 slopes inward to the flat front face 16. The top portion 18 of the tapered front section 14 can house a first laser sight 20 and a first light 22. The first light 22 is preferably a LED (light emitting diode) light but may be any light that will sufficiently provide light to the user. The first light 22 also preferably has low light and night vision modes. Preferably, all exterior edges are beveled. A microphone may also be on the flat front face 16 to capture sounds coming from in front of the user.

The housing 12 includes a digital camera 24. The digital camera 24 serves as the sight for the user of the weapon. Alternatively, digital camera 24 comprises a thermal imaging camera. The lens 26 of the camera is preferably flush with the flat front face 16 of housing 12. The digital camera 24 is augmented by the use of a heat camera 28 and night vision camera 30, also preferably flush with the flat front face 16. All cameras described herein should have the ability to simultaneously shoot and record images in high definition, have auto focus, image stabilization, and optical zoom of 60× or higher. Given Bluetooth or WiFi capability, the cameras will also allow for soldiers to access facial recognition databases for situations where individuals need to be identified such as terrorism or victims of kidnapping and most other threats.

The housing 12 also includes a back face 32, a first side face 34, a second side face 36, a top face 38, a bottom face 40, and a removable secondary device 42. The removable secondary device 42 also preferably includes a second laser sight 44 and second light 46. When the removable secondary device 42 is engaged with the housing 12 (as will be described in more detail below), the second laser sight 44 and second light 46 are preferably inoperable so that there is no confusion with the first laser sight 20 and first light 22. First light 22 and second light 46 may also operate at the same time to provide the user with more light. The top face 38, front face 16, first side face 34, and second side face 36 also preferably have solar panels 48 to provide power to the digital firearm sight 10. Additionally, solar panels 48 may be present on the removable secondary device 42, preferably on the sides. Preferably, the housing is between 2-3.5 inches in length, between 2-3.5 inches in height, and about 3.5 inches in width, which is standard for housing a camera with retractable zoom. The housing is waterproof, shock proof, dust proof, sand proof, and prevents debris from entering the housing and compromising any camera. There is also the option of adding GPS tracking to the housing 12 which would allow the user to sync his movements with those of others around him and to find other friendly users.

The bottom face 40 is connected to a base 112 having a first rail system 90. The first rail system is preferably picatinny style but can be any type of rail system that will allow the digital firearm sight 10 to attach to a firearm such as a Weaver rail.

Figure 2:
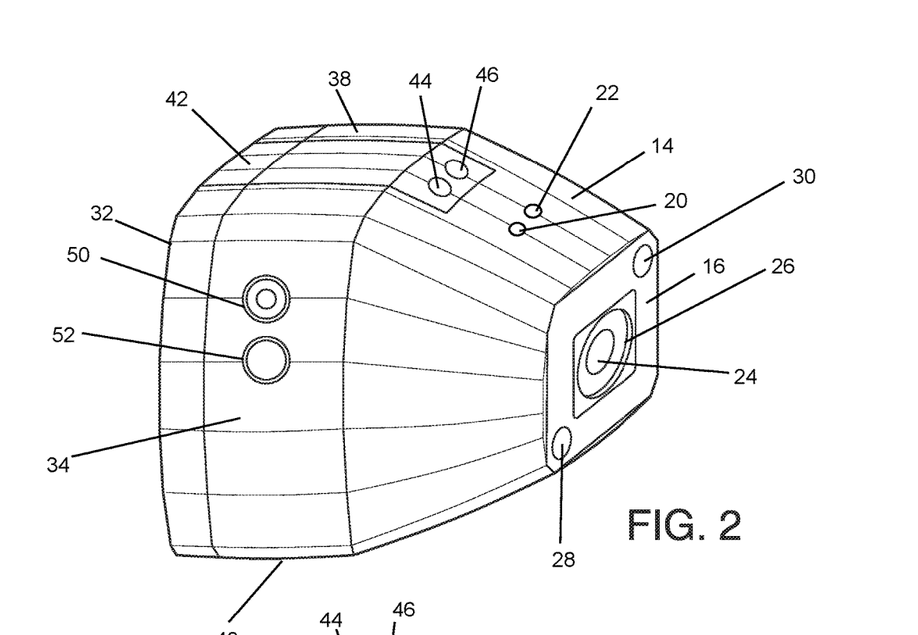
FIG. 2 is a first side perspective view of the digital firearm sight.
Figure 3:
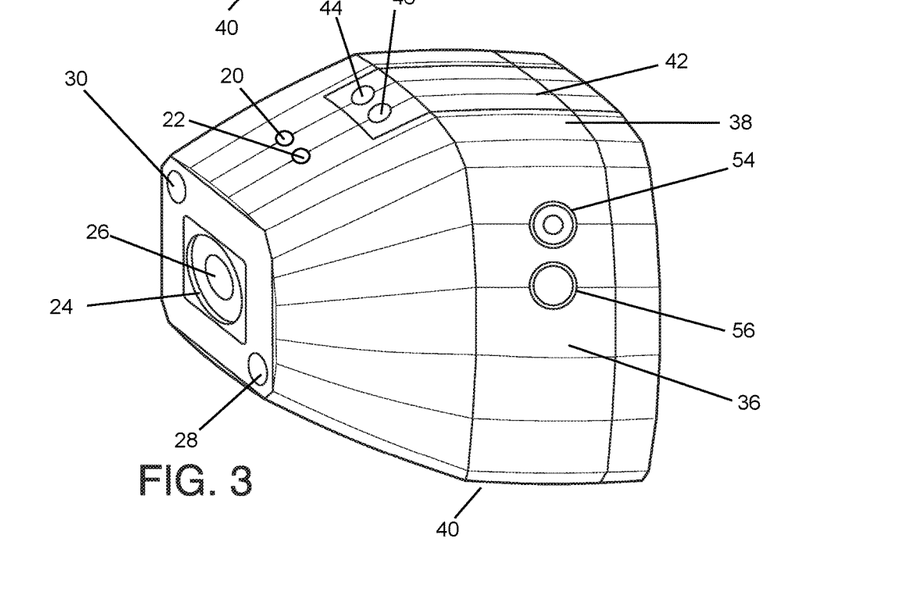
FIG. 3 is a second side perspective view of the digital firearm sight.

As can be seen in FIG. 2 and FIG. 3, the housing also comprises a first side camera 50 and first side motion sensor 52 as well as second side camera 54 and second side motion sensor 56. These sensors allow the user to be aware of animals or enemies or other individuals approaching while looking through the digital firearm sight 10. These cameras and sensors allow the user to receive an alert that someone or something is nearby. The distance of the alert can be anywhere from close proximity to between 25 yards and 500 yards.

Figure 4:
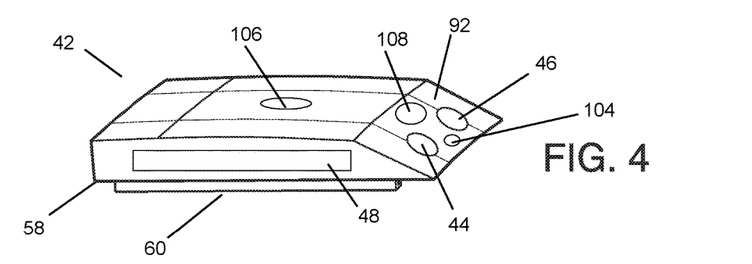
FIG. 4 is a side perspective view of the removable secondary sight.
Figure 5:
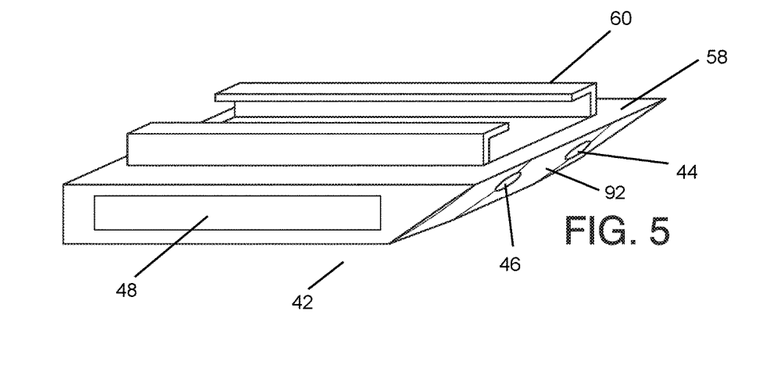
FIG. 5 is a side perspective view of the removable secondary sight focusing on the rail system.
Figure 9:
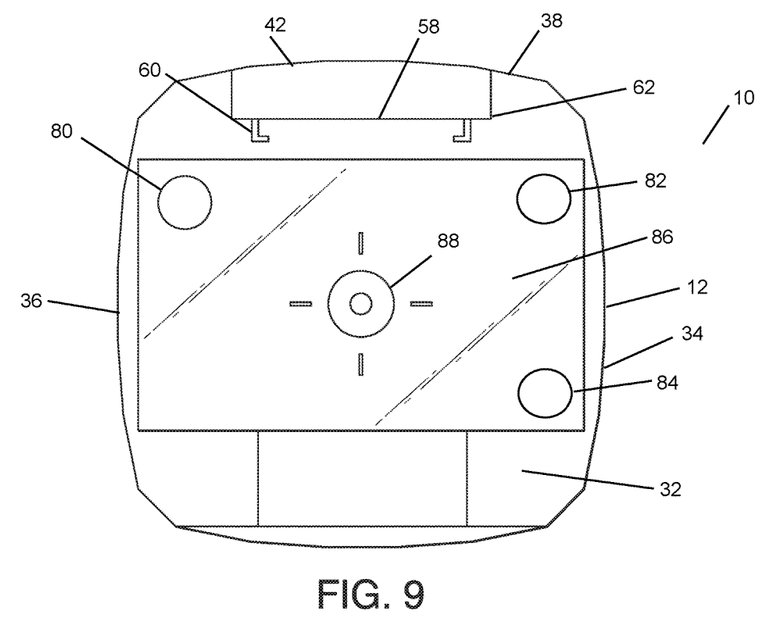
FIG. 9 is a rear perspective view of the digital firearm sight.

As shown in FIG. 4 and FIG. 5, the removable secondary device 42 comprises a front sloped portion 92 where the second laser sight 44 and second light 46 shine. The removable secondary device 42 has a secondary bottom face 58 to a secondary rail system 60 is attached. The removable secondary device 42 also preferably has an upward motion sensor 106 built in as well as a holographic display system 108. The holographic display system can be on the front sloped portion 92 or on the sides or both. Preferably, the holograph will show data such as the user's accuracy and remaining ammunition. The holograph can be displayed either in the air or on a surface. As shown in FIG. 9, the housing 12 has a notch 62 to receive the secondary rail system 60 of the removable secondary device 42. The secondary rail system 60 is preferably picatinny style or any other similar rail system which locks into place. The secondary rail system 60 shown in FIG. 4 and FIG. 5 is a simple puzzle-piece style system but can be any type of rail system which locks into place.

Figure 6:
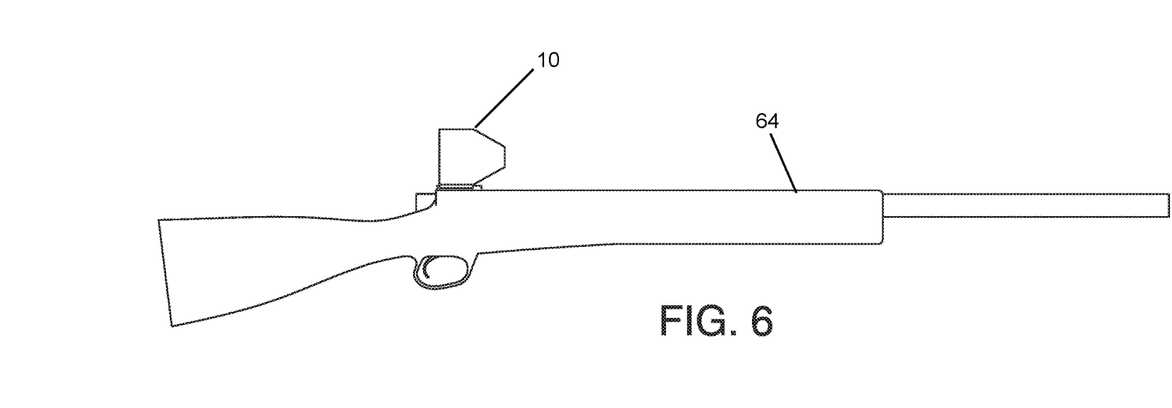
FIG. 6 is a side view of a rifle with an engaged digital firearm sight.
Figure 7:
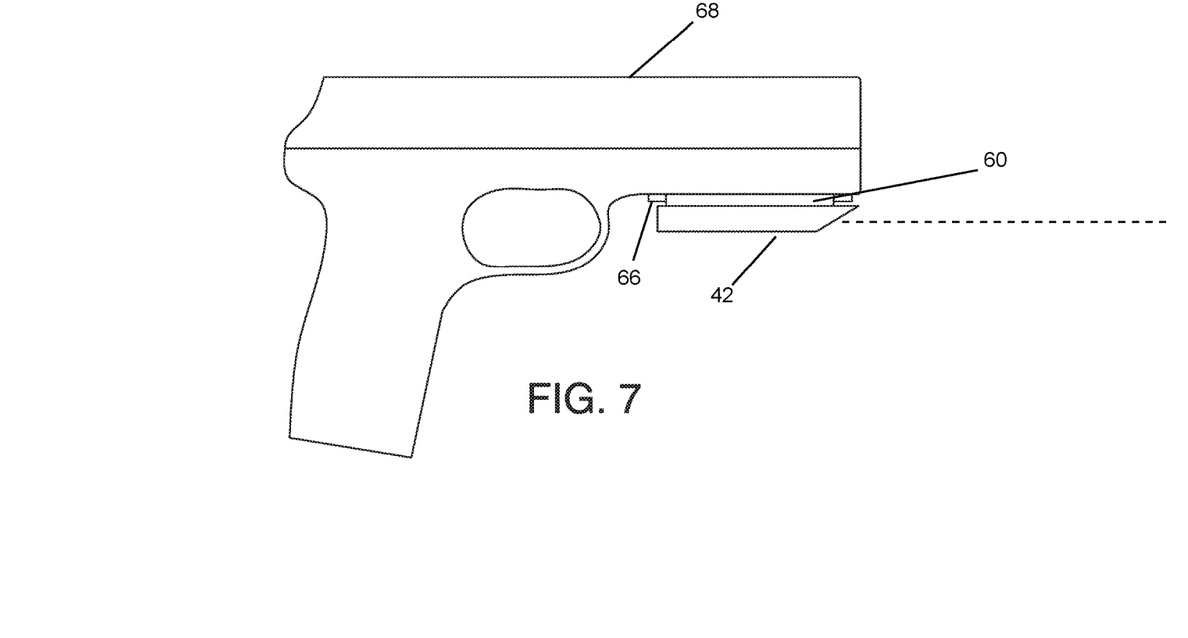
FIG. 7 is a side view of a pistol with an engaged removable secondary sight.

As shown in FIG. 6, the digital firearm sight 10 can be attached to a rifle 64. Preferably, the digital firearm sight 10 is placed where a traditional sight would be placed but can be anywhere that is comfortable for the user to aim accurately. Similarly, as shown in FIG. 7, the removable secondary device 42 can be removed from the housing 12 and the secondary rail system 60 can interlock with a pistol rail system 66 placed on the underside of a pistol 68. This placement allows for the second laser sight 44 to provide guidance to a user without blocking the view down the barrel of the pistol 68. The removable secondary device 42 may also include a secondary camera 104 so that, when attached to the pistol 68, it can take still images or video.

Figure 8:
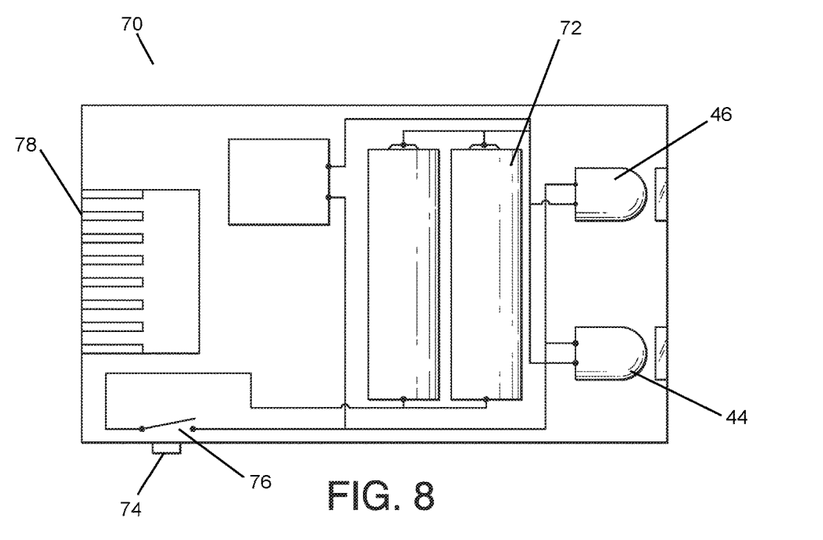
FIG. 8 is a circuitry diagram for the removable secondary sight.

FIG. 8 shows the interior circuitry 70 of the removable secondary device 42. The removable secondary device 42 houses the power source 72 for the removable secondary device 42 which is engaged using a power button 74 which opens and shuts a switch 76. The power source 72 is the source of power for the second laser sight 44, second light 46, motion sensor 106, and holographic display system 108. Further, there is the option of including space for a cushion 78.

FIG. 9 depicts a rear view of the digital firearm sight 10. The back face 32 comprises a touch screen display 86 further comprising a reticle 88, rear-facing camera 80, rear-facing motion sensor 82, and rear-facing microphone 84. The rear-facing camera 80 allows a user to take photos of themselves while shooting and take pictures of scenes behind the firearm. Reticle 88 can be any standard reticle design based on user preference and includes the ability to change color for color-blind users. Rear-facing microphone 84 allows for voice recognition or vocal control so that the user can use voice commands to fire the firearm and other settings.

Figure 10:
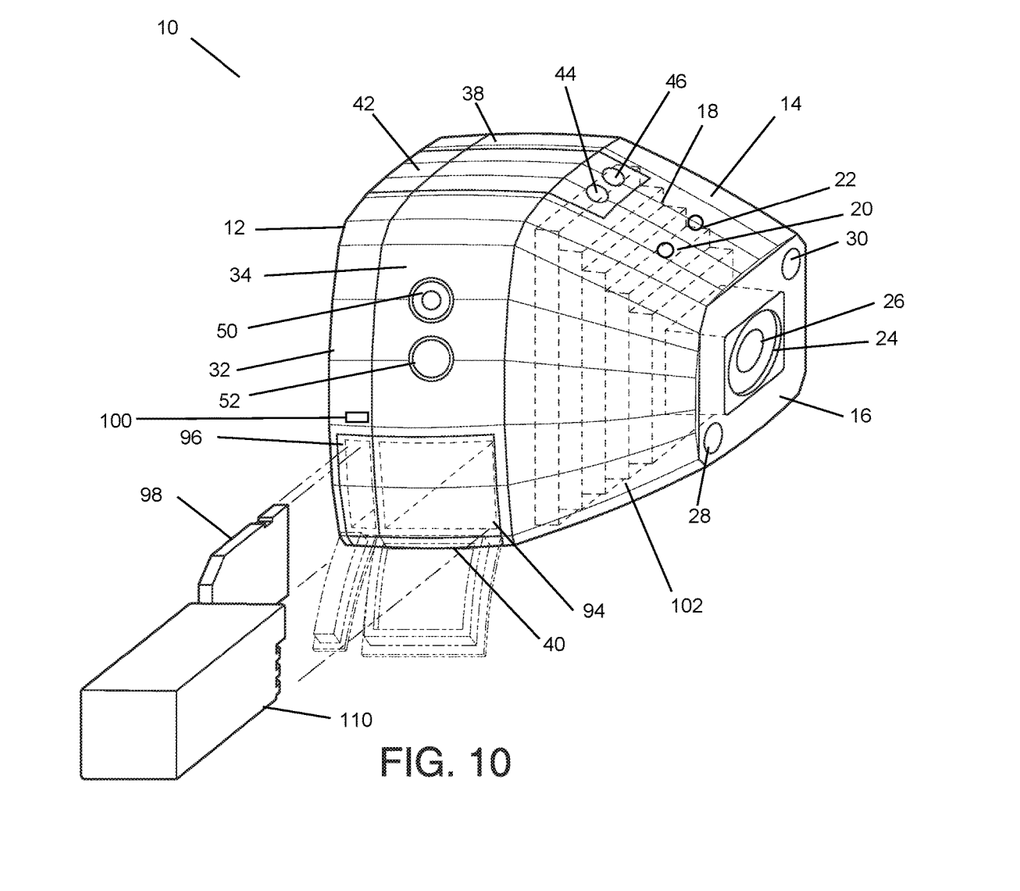
FIG. 10 is a perspective view of the digital firearm sight showing a variety of ports and internal aspects.

FIG. 10 depicts a perspective view of the digital firearm sight 10. In particular, the housing 12 has battery 110 which is placed within housing 12 using battery port 94. Additionally, the housing 12 may also include a SD port 96 to support an SD card 98 to store images as well as a USB port 100 to attach other peripheral equipment. The USB port 100 may be of any configuration based on what is now known or to be discovered. Also shown are the extendable tiers 102 which allow for the digital camera 24 to reach the 60× or higher zoom.

The invention being described, it will be obvious that the same may be varied in many ways. Such variations are not to be regarded as a departure from the spirit and scope of the invention, and all such modifications as would be obvious to one of ordinary skill in the art are intended to be included with the scope of the following claims.

What is claimed is:

1. A firearm sight comprising:
    a housing having beveled edges and further comprising a tapered front section, a back face, a first side face, a second side face, a top face, a bottom face, and a removable secondary device, wherein the secondary device connects to the top face using a rail connection;
    at least one light, one microphone, and at least one laser sight located on the front section;
    at least one secondary light, at least one secondary laser sight, and at least one motion sensor on the secondary device, wherein the secondary light and secondary laser sight are inoperable when engaged with the top face of the housing;
    a holographic display system housed within the removable secondary device;
    at least one first side camera and first motion sensor on the first side face;
    at least one second side camera and second motion sensor on the second side face;
    a digital camera housed within the housing comprising a lens and extendable tiers to allow for zoom;
    a touch screen display on the back face, wherein the touch screen display further comprises a rear-facing camera and a third motion sensor;
    a base attached to the bottom face.

2. The firearm sight of claim 1 wherein the firearm sight is detachable from a firearm.

3. The firearm sight of claim 1 wherein the firearm sight has a length between 1.5 and 3.5 inches, a height between 1.5 and 35 inches, and a width of 3.5 inches.

4. The firearm sight of claim 1 wherein the base has a length of 3.5 inches, a width between 1.5 and 35 inches, and a height of 3.5 inches.

5. The firearm sight of the claim 1 wherein the lens is polarized.

6. The firearm sight of claim 1 wherein the digital camera is high definition.

7. The firearm sight of claim 1 wherein the rail connection is picatinny style.

8. The firearm sight of claim 1 wherein the rail connection is MIL-STD-1913.

9. The firearm sight of claim 1 wherein the rail connection is weaver style.

10. The firearm sight of claim 1 wherein the base further comprises a picatinny rail system on a bottom side of the base.

11. The firearm sight of claim 1 wherein the digital camera has thermal heat imaging and night vision capabilities.

12. The firearm sight of claim 1 wherein the housing further comprises a GPS tracking system housed within the housing.

13. The firearm sight of claim 1 wherein the firearm sight further comprises a microphone and speaker on the front face and back face.

14. The firearm sight of claim 1 further comprising at least one solar panel on the top face of the housing.

15. A firearm sight comprising:
    a housing further comprising a removable secondary device;
    a plurality of cameras positioned in the housing;
    a plurality of lights positioned in the housing with at least one light positioned in the removable secondary device;
    a plurality of motion sensors positioned in the housing with at least one motion sensor positioned in the removable secondary device;
    a touch-screen display on a back face of the housing; and
    a base.

16. The firearm sight of claim 15 wherein the firearm sight is detachable.

17. The firearm sight of claim 13 wherein the housing further comprises a tapered front section, a back face, a first side face, a second side face, a top face, a bottom face.

18. The firearm sight of claim 17 wherein the removable secondary sight connects to the top face using a rail connection and locks into place while connected to the housing.

19. The firearm sight of claim 17 wherein the firearm sight further comprises a microphone and speaker on the front face and back face.

20. The firearm sight of claim 17 further comprising at least one solar panel on the top face of the housing.

21. The firearm sight of claim 15 wherein the light and the motion sensor positioned in the removable secondary sight are inoperable when the removable secondary sight is engaged with the housing.

22. The firearm sight of claim 18 wherein the rail connection is picatinny style.

23. The firearm sight of claim 18 wherein the rail connection is MIL-STD-1913.

24. The firearm sight of claim 18 wherein the rail connection is weaver style.

25. The firearm sight of claim 15 wherein the firearm sight has a length between 1.5 and 3.5 inches, a height between 1.5 and 3.5 inches, and a width of 90 millimeters.

26. The firearm sight of claim 15 wherein the base has a length of 3.5 inches, a width between 1.5 and 3.5 inches, and a height of 90 millimeters.

27. The firearm sight of claim 15 wherein the plurality of cameras further comprise polarized lenses.

28. The firearm sight of claim 15 wherein the plurality of cameras have thermal imaging capabilities.

29. The firearm sight of claim 15 wherein the plurality of cameras have night vision capabilities.

30. The firearm sight of claim 15 wherein the base further comprises a picatinny rail system on a bottom side of the base.

31. The firearm sight of claim 15 wherein the housing has beveled edges.

32. The firearm sight of claim 15 wherein the light positioned in the removable secondary device is inoperable when engaged with the top face of the housing.

* * * * *

UNITED STATES PATENT AND TRADEMARK OFFICE
CERTIFICATE OF CORRECTION

PATENT NO. : 10,042,243 B1
APPLICATION NO. : 15/458057
DATED : August 7, 2018
INVENTOR(S) : Lugol Metayer Page 1 of 1

It is certified that error appears in the above-identified patent and that said Letters Patent is hereby corrected as shown below:

In the Claims

Column 6, Line 17, delete "35" and insert -- 3.5 -- therefor.

Column 6, Line 19, delete "35" and insert -- 3.5 -- therefor.

Signed and Sealed this
Twenty-fifth Day of September, 2018

Andrei Iancu
*Director of the United States Patent and Trademark Office*